United States Patent [19]

Stelte et al.

[11] 4,286,119

[45] Aug. 25, 1981

[54] ARRANGEMENT FOR CONCENTRATING PULSE CODE MODULATION PROCESSING CIRCUITS IN A DIGITAL TELEPHONE OFFICE

[75] Inventors: David J. Stelte, Lombard; Alex W. Kobylar, Chicago, both of Ill.

[73] Assignee: GTE Automatic Electric Labs Inc., Northlake, Ill.

[21] Appl. No.: 92,873

[22] Filed: Nov. 9, 1979

[51] Int. Cl.³ .............................................. H04Q 3/60
[52] U.S. Cl. .................................................. 179/18 FC
[58] Field of Search ........... 179/18 FC, 18 AD, 18 B, 179/18 BE, 18 EA

[56] References Cited

U.S. PATENT DOCUMENTS 4,021,619  5/1977  Potter et al. ..................... 179/18 FC Primary Examiner—Thomas A. Robinson
Attorney, Agent, or Firm—Robert J. Black; Gregory G. Hendricks

[57] ABSTRACT

Pulse Code Modulation (PCM) line circuits include analog and PCM processing circuitry. These circuits are separated into an analog line circuit portion and a PCM processing circuit portion. An analog network is connected to the analog line circuits and provides concentration to a minimal number of PCM processing circuits.

11 Claims, 3 Drawing Figures

ARRANGEMENT FOR CONCENTRATING PULSE CODE MODULATION PROCESSING CIRCUITS IN A DIGITAL TELEPHONE OFFICE

BACKGROUND OF THE INVENTION (1) Field of the Invention

The present invention relates to digital telephone offices and more particularly to a method for minimizing the number of Pulse Code Modulation (PCM) processing circuits associated with line circuits for such telephone offices. The line circuit is separated into an analog line circuit portion and PCM processing circuitry. An analog network is connected to the analog line circuits to provide concentration to a minimal number of PCM processing circuits.

(2) Description of the Prior Art

Line circuits for digital telephone end offices are of a hybrid nature in that they use analog circuitry for interfacing to the various subscriber stations and they are Pulse Code Modulation (PCM) circuitry for interfacing to the digital network of the digital telephone office. These line circuits are complex and expensive, and numerous varieties of them are required to operate with the numerous types of subscriber equipment, such as party lines, coin telephones, etc. Every line circuit requires loop status circuitry, but PCM processing circuitry, coin detection circuitry, party line circuitry, line testing circuitry and line simulation circuitry need not be dedicated to the corresponding line circuits. Therefore, by separating the analog line circuit into common analog line circuitry, PCM processing circuitry and specialized analog line circuitry, the highly complex and expensive PCM processing circuitry can be minimized since it will only be used when a subscriber is connected to the digital network. Similarly, the specialized analog line circuitry can be minimized since it will only be used when the associated specialized analog functions are performed. Also, the line circuit which must be provided for each line now comprises only the minimal common line circuitry for the supervisory function and can be used for any type of subscriber.

Accordingly, it is the object of the present invention to provide a novel arrangement for minimizing the required number of PCM line processing circuits in a digital telephone office. Additional features of this invention are a minimal component, common line circuit and minimization of specialized analog line circuitry.

SUMMARY OF THE INVENTION

The present invention provides an arrangement for concentrating Pulse Code Modulation (PCM) processing circuits in a digital telephone end office. This arrangement also provides for concentration of specialized analog line circuitry, thereby allowing the use of a common, basic, supervisory line circuit for all subscriber stations.

The concentration arrangement includes an analog network connected between a plurality of supervisory line circuits, PCM processing circuits and specialized analog circuits. The PCM processing circuits are connected to a digital network and to a processing unit which is further connected to the supervisory line circuits, the specialized analog line circuits, the analog network and the digital network.

When a subscriber station requires service the processing unit detects this condition via the supervisory line circuit and, if required, connects one of the specialized analog circuits to the analog network which then connects the line circuit requesting service to the required specialized analog circuit. Upon termination of the need for such specialized circuitry the processing unit disconnects it from the analog network and, if required, connects a PCM processing circuit to the line requesting service via the analog network. Thus, the line requesting service is connected to the digital network via the PCM processing circuit and signaling and transmission functions are handled via the digital network and processing unit.

The present invention thus allows the use of a minimal number of PCM processing circuits, a minimal number of specialized analog circuits and a common basic supervisory line circuit, by providing an analog network between the common line circuit and the PCM processing and specialized analog portions of a PCM line circuit.

DESCRIPTION OF THE PREFERRED EMBODIMENT

Figure 1:
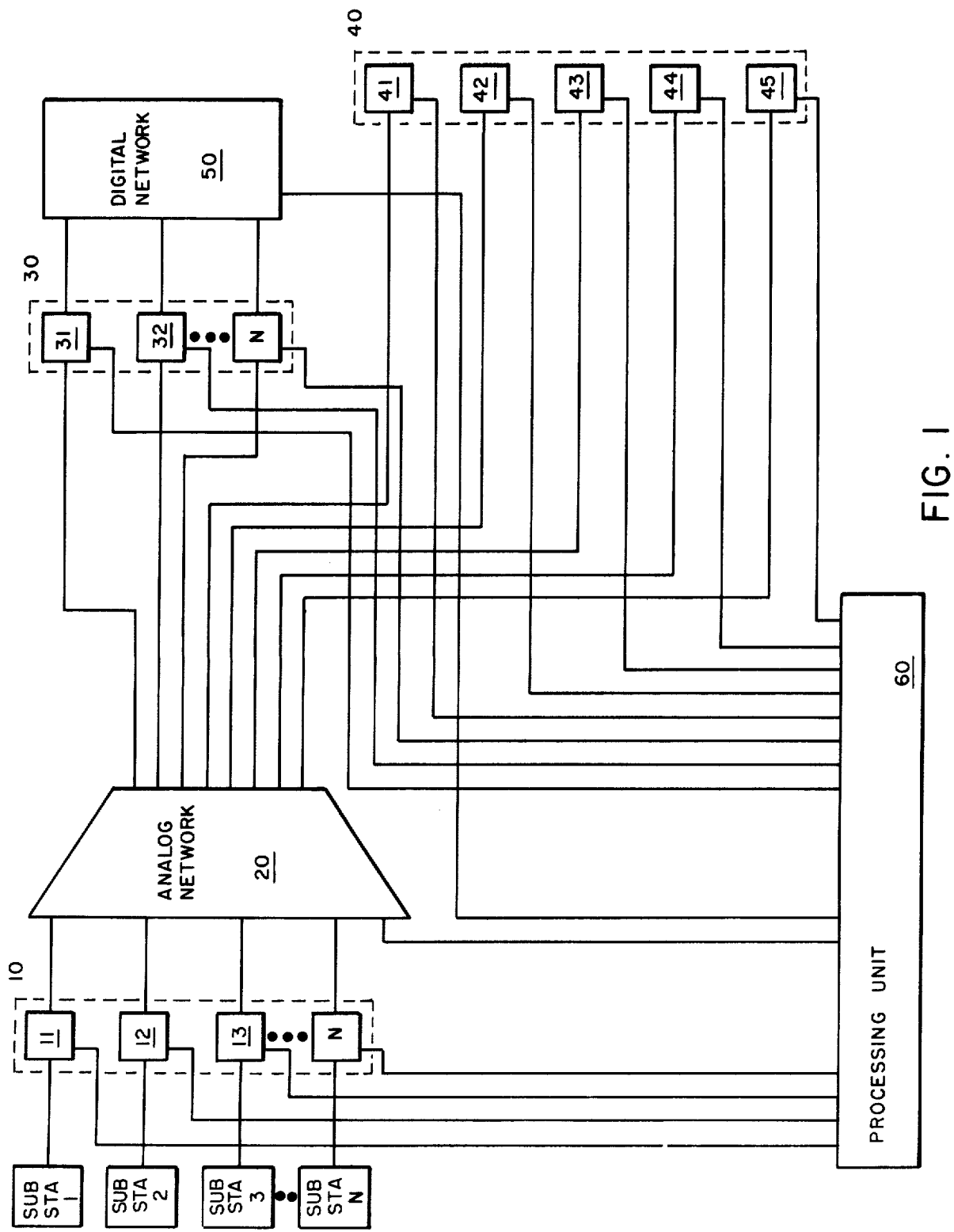
FIG. 1 of the accompanying drawing is a block diagram of an arrangement for concentrating Pulse Code Modulation (PCM) processing circuits in a digital telephone office, in accordance with the present invention.

Referring now to FIG. 1, the concentrating arrangement for Pulse Code Modulation (PCM) processing circuits of the present invention is shown connected to a plurality of subscriber stations. The supervisory line circuits 10 are shown connected to associated subscriber stations and to analog network 20. PCM processing circuits 30 and specialized analog circuits 40 are shown connected to analog network 20. PCM processing circuits 30 are also connected to digital network 50 which is connected to processing unit 60. Supervisory line circuits 10, analog network 20 and specialized analog circuits 40 are also connected to processing unit 60.

Figure 2:
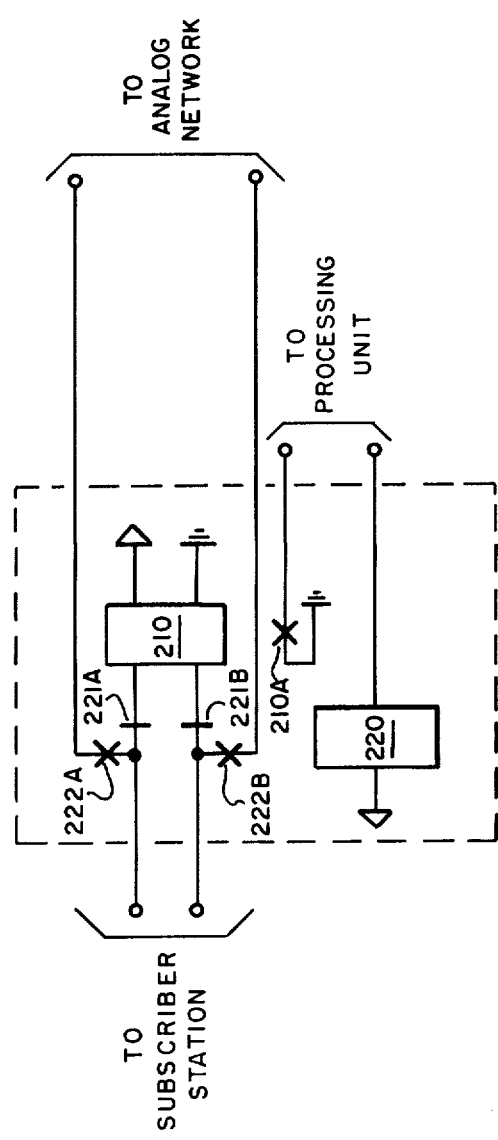
FIG. 2 is a circuit diagram of a supervisory line circuit in accordance with the present invention.
Figure 3:
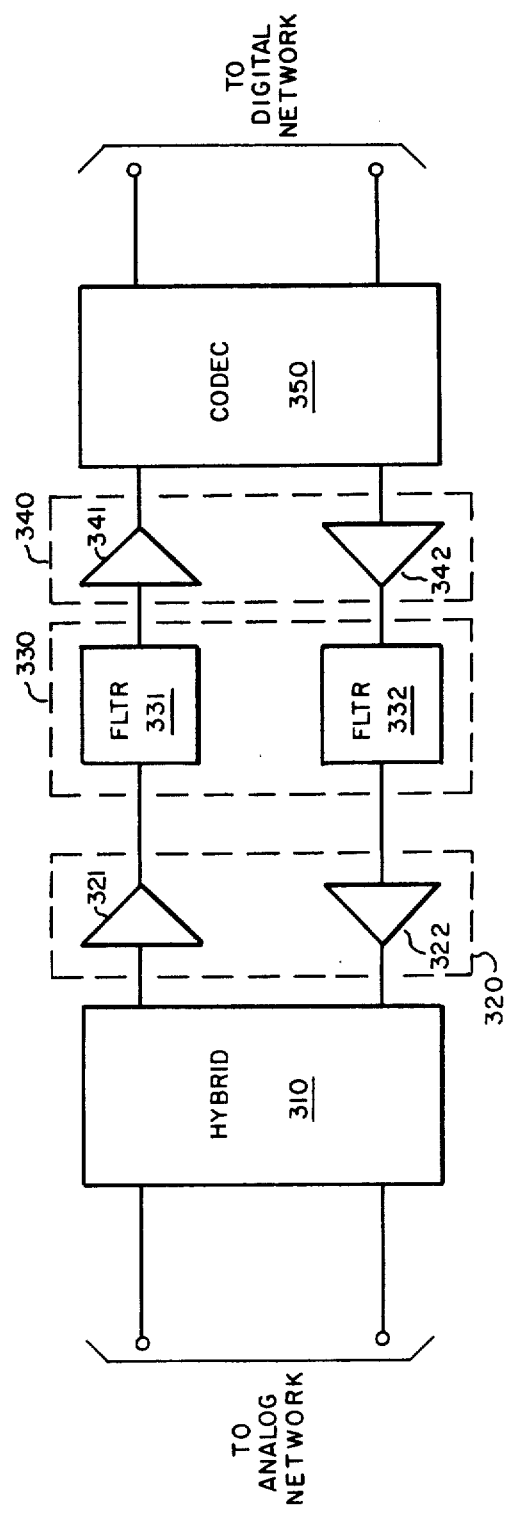
FIG. 3 is a block diagram of a PCM processing circuit in accordance with the present invention.

Digital networks are well known such as that used in Automatic Electric's No. 3 EAX, and analog networks and specialized analog line circuitry are also well known such as that used in Automatic Electric's No. 2 EAX. A supervisory line circuit as used in the present invention is shown in FIG. 2 and a PCM processing circuit as used in the present invention is shown in FIG. 3.

When subscriber station 1 goes off hook, associated supervisory line circuit 11 detects this condition and signals processing unit 60. Upon determination of the class of service associated with an "off-hook" subscriber station, processing unit 60 connects the appropriate specialized analog circuit (coin circuit 41, or party line circuit 42), to analog network 20. Since the "off-hook" subscriber station is also connected to analog network 20 via supervisory line circuit 11, a connection is made between them by analog network 20 under control of processing unit 60. Upon determination that the connected specialized analog circuit is no longer required, processing unit 60 will disconnect it from analog network 20 and if required connect a PCM processing circuit 31 to analog network 20. Similarly, since both the supervisory line circuit 11 and PCM processing circuit 31 have appearances on analog network 20 they will be connected to each other by analog network 20.

PCM processing circuit 31 converts the analog signals from the "off-hook" subscriber station to digital signals to be processed by digital network 50. Processing unit 60 analyzes these signals to determine the called party to be connected to the "off-hook" subscriber station and will then connect a PCM processing circuit to the called party's line circuit via the analog network. Processing unit 60 will finally provide for a connection to the called party in digital network 50.

The other specialized analog circuits, ringing generator 43, line testing circuit 44, and line simulating circuit 45 are similarly connected to analog network 20. Ringing generator 43 is connected to the line circuit of the called party via analog network 20 and line testing circuit 44 is connected to an idle line circuit via analog network 20. Line simulating circuit 45, however is connected to a PCM processing circuit via analog network 20. It is obvious that other specialized analog circuits could also be connected to analog network 20.

Thus PCM processing circuits are connected to subscriber stations via the analog network only when needed. Similarly specialized analog circuits 40 are only connected to subscribers when needed.

Referring now to FIG. 2, the supervisory line circuit of the present invention is shown connected to a subscriber station, analog network and processing unit. Supervisory relay 210 operates in response to completion of the loop through the subscriber station when its handset is taken "off-hook". Supervisory relay 210 transmits this "off-hook" status of the subscriber station to processing unit 60 via contacts 210A. When processing unit 60 determines that a subscriber station is to be connected to the analog network it operates relay 220.

Referring now to FIG. 3, the PCM processing circuit of the present invention is shown connected between an analog network and a digital network. The hybrid circuit, amplifiers, filters, gating circuits and codec are all old and well known circuits for converting analog signals into PCM signals. Hybrid 310 operates to convert the two-wire signaling method used in the analog network to the four-wire signaling method used in the digital network. Amplifier 321 and filter 331 operate to present signals of sufficient magnitude and resolution to gate 341 to allow it to convert analog signals into pulse amplitude modulated (PAM) signals, i.e. gate 341 generates periodic signals representative of the amplitude of the incoming analog signal. Codec 350 converts each PAM signal into a Pulse Code Modulation (PCM) signal by generating a binary coded signal representative of each PAM signal that it receives. Codec 350, gate 342, filter 332 and amplifier 322 operate similarly to perform the reverse function, i.e., convert the PCM signals used in the digital network to the analog signals used in the analog network.

The concentrating arrangement for PCM processing circuits of the present invention allows the use of a minimum number of PCM processing circuits and a common supervisory line circuit for all subscriber stations. It also allows for minimization of specialized analog circuitry such as party line and coin detection circuits.

It will be obvious to those skilled in the art that numerous modifications of the present invention can be made without departing from the spirit of the invention which shall be limited only by the scope of the claims appended hereto.

What is claimed is:

1. An arrangement for concentrating pulse code modulation processing circuitry in a digital switching system, including a plurality of subscriber stations each operated to generate off-hook signals, said arrangement comprising:

a plurality of line supervisory means each connected to an associated one of said subscriber stations, each operated in response to said off-hook signal to generate a supervisory signal;

a processing unit connected to said plurality of line supervisory means, operated in response to said plurality of supervisory signals to generate a plurality of supervisory enable signals and a plurality of modulation enable signals;

connection means connected to said plurality of line supervisory means;

a plurality of pulse code modulation means connected to said processing unit, each operated in response to an associated one of said modulation enable signals to connect to said connection means;

each of said plurality of line supervisory means further operated in response to an associated one of said supervisory enable signals to connect to said connection means; and said connection means operated in response to connection of said line supervisory means and said pulse code modulation means to connect said line supervisory means to said pulse code modulation means.

2. The circuit of claim 1, wherein said processing unit is further operated to generate a ringing control signal, said concentrating arrangement further comprising:

ringing means connected to said processing unit operated in response to said ringing control signal to connect to said connection means;

said connection means further operated in response to connection of said ringing means to connect said ringing means to said line supervisory means.

3. The circuit of claim 1, wherein said processing unit is further operated to generate a party line control signal, said concentrating arrangement further comprising:

party line detection means connected to said processing unit, operated in response to said party line control signal to connect to said connection means;

said connection means further operated in response to connection of said party line detection means to connect said party line detection means to said line supervisory means.

4. The circuit of claim 1, wherein said processing unit is further operated to generate a coin control signal, said concentrating arrangement further comprising:

coin detection means connected to said processing unit, operated in response to said coin control signal to connect to said connection means;

said connection means further operated in response to connection of said coin detection means to connect said coin detection means to said line supervisory means.

5. The circuit of claim 1, wherein said processing unit is further operated to generate a line test enable signal, said concentrating arrangement further comprising:

line testing means connected to said processing unit, operated in response to said line test enable signal to connect to said connection means;

said connection means further operated in response to connection of said line testing means to connect said line testing means to said line supervisory means.

6. The circuit of claim 1, wherein said processing unit is further operated to generate a line simulate enable signal, said concentrating arrangement further comprising:

line simulating means connected to said processing unit, operated in response to said line simulate enable signal to connect to said connection means;

said pulse code modulation means further operated in response to said line simulate enable signal to connect to said connection means;

said connection means operated in response to connection of said line simulating means and said pulse code modulation means to connect said line simulating means to said pulse code modulation means.

7. The circuit of claim 1, wherein said line supervisory means comprise a supervisory relay operated in response to said off-hook signal to generate said supervisory signal.

8. The circuit of claim 1, wherein said line supervisory means further comprise: a transfer relay operated in response to said supervisory enable signal to connect said line supervisory means to said connection means.

9. The circuit of claim 1, wherein said plurality of subscriber stations are further operated to generate subscriber signals, said pulse code modulation processing means comprise:

pulse amplitude modulation means operated in response to said subscriber signals to generate pulse amplitude modulated signals.

10. The circuit of claim 9, wherein said pulse code modulation processing means further comprise: coding means connected to said pulse amplitude modulation means, operated in response to said pulse amplitude modulated signals to generate pulse code modulated signals.

11. The circuit of claim 1, wherein said connection means comprise: an analog network.

* * * * *